United States Patent
Rogness et al.

(10) Patent No.: US 11,364,920 B2
(45) Date of Patent: Jun. 21, 2022

(54) METHODS AND APPARATUS TO COMPENSATE FOR BODY ROLL IN VEHICLE WEIGHT CALCULATIONS

(71) Applicant: Ford Global Technologies, LLC, Dearborn, MI (US)

(72) Inventors: Anton Rogness, Dearborn, MI (US); Andrew Niedert, Farmington Hills, MI (US); Elliott Pearson, Shelby Township, MI (US); Joshua Rajasingh, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 16/261,088

(22) Filed: Jan. 29, 2019

(65) Prior Publication Data
US 2019/0337523 A1    Nov. 7, 2019

Related U.S. Application Data

(60) Provisional application No. 62/665,340, filed on May 1, 2018.

(51) Int. Cl.
*B60W 40/112* (2012.01)
*B60W 40/13* (2012.01)
(Continued)

(52) U.S. Cl.
CPC ....... *B60W 40/112* (2013.01); *B60G 17/0162* (2013.01); *B60W 10/22* (2013.01);
(Continued)

(58) Field of Classification Search
CPC .... B60W 40/112; B60W 40/13; B60W 10/22; B60W 2520/18; B60W 2040/133; B60W 2510/22; B60G 17/0162; B60G 2400/0531; B60G 2400/0532; B60G 2400/60; B60G 2401/12; B60G 2401/142; B60G 2800/012; B60G 2400/252; B60G 2400/0511; B60G 17/0182; B60G 2800/70; B60G 2200/144;
(Continued)

(56) References Cited

U.S. PATENT DOCUMENTS 4,237,994 A * 12/1980 McColl ................ B62D 53/005
                                                         180/179
4,487,429 A * 12/1984 Ruggles ................... B60G 3/01
                                                         280/124.127
(Continued)

FOREIGN PATENT DOCUMENTS

FR           2943782       10/2010
JP         2006232023        9/2006
JP         2017056821        3/2017

*Primary Examiner* — B M M Hannan
(74) *Attorney, Agent, or Firm* — Ray Coppiellie; Hanley, Flight & Zimmerman, LLC

(57) ABSTRACT

Methods and apparatus to compensate for body roll in vehicle weight calculations are disclosed. An example method includes receiving sensor data from sensors of a vehicle, determining a weight of the vehicle and determining a body roll of the vehicle. The example method further includes comparing the body roll to a threshold and, if the body roll satisfies the threshold, adjusting the determined weight of the vehicle based on the determined body roll and properties of a suspension system of the vehicle.

14 Claims, 7 Drawing Sheets

(51) Int. Cl.
*B60W 10/22* (2006.01)
*B60G 17/016* (2006.01)

(52) U.S. Cl.
CPC ....... *B60W 40/13* (2013.01); *B60W 2040/133* (2013.01); *B60W 2520/18* (2013.01)

(58) Field of Classification Search
CPC .... B60G 2600/02; B60G 3/20; B60G 17/015; B60G 17/01908; G01G 19/08
USPC ................ 701/36–38, 105, 124, 267, 280
See application file for complete search history.

(56) References Cited

U.S. PATENT DOCUMENTS

| | | | | |
|---|---|---|---|---|
| 4,765,649 | A * | 8/1988 | Ikemoto | B60G 17/0162 280/5.506 |
| 4,903,983 | A * | 2/1990 | Fukushima | B60G 17/0162 280/5.503 |
| 5,480,188 | A * | 1/1996 | Heyring | B60G 21/06 280/124.104 |
| 5,490,068 | A * | 2/1996 | Shimizu | B60G 17/018 280/5.504 |
| 5,735,509 | A * | 4/1998 | Gryp | B60N 2/501 248/550 |
| 5,742,918 | A * | 4/1998 | Ashrafi | B60G 17/01933 180/197 |
| 5,825,284 | A * | 10/1998 | Dunwoody | B61F 5/245 340/440 |
| 6,904,794 | B2 | 6/2005 | Stiller | |
| 7,440,844 | B2 | 10/2008 | Barta et al. | |
| 9,290,165 | B2 | 3/2016 | Messih et al. | |
| 2003/0204293 | A1 * | 10/2003 | Shiino | B60G 17/0162 701/37 |
| 2003/0230443 | A1 * | 12/2003 | Cramer | B60G 3/20 180/65.51 |
| 2004/0019418 | A1 * | 1/2004 | Lu | B60T 17/22 701/38 |
| 2004/0245732 | A1 * | 12/2004 | Kotulla | B60G 21/0555 280/5.502 |
| 2005/0087389 | A1 * | 4/2005 | Turner | B62D 6/002 180/446 |
| 2006/0064218 | A1 * | 3/2006 | Subbian | B60R 21/0132 701/45 |
| 2006/0071441 | A1 * | 4/2006 | Mathis | B60G 11/16 280/124.128 |
| 2006/0129291 | A1 * | 6/2006 | Lu | B60T 8/17554 701/36 |
| 2006/0129298 | A1 * | 6/2006 | Takeda | B60T 8/17554 701/70 |
| 2007/0017727 | A1 * | 1/2007 | Messih | B60T 8/1755 180/282 |
| 2007/0067080 | A1 * | 3/2007 | Messih | B60T 8/172 701/37 |
| 2008/0281487 | A1 * | 11/2008 | Milot | B60G 17/0195 701/38 |
| 2009/0234537 | A1 * | 9/2009 | Tomida | B60G 17/08 701/38 |
| 2010/0059944 | A1 * | 3/2010 | Oteman | B60G 17/0157 280/6.157 |
| 2010/0138114 | A1 * | 6/2010 | Yoshida | B60R 21/0132 701/46 |
| 2010/0168961 | A1 * | 7/2010 | Messih | B60W 40/11 701/38 |
| 2010/0222960 | A1 * | 9/2010 | Oida | B60N 2/501 701/31.4 |
| 2010/0314842 | A1 * | 12/2010 | Rodenbeck | B60G 11/16 280/5.516 |
| 2013/0151075 | A1 * | 6/2013 | Moshchuk | B60G 17/015 701/38 |
| 2015/0039184 | A1 * | 2/2015 | Voet | B60G 17/0165 701/38 |
| 2015/0224845 | A1 * | 8/2015 | Anderson | B60G 17/052 701/37 |
| 2017/0043777 | A1 * | 2/2017 | Books | B60K 6/48 |
| 2019/0359025 | A1 * | 11/2019 | Wager | B60G 21/073 |

* cited by examiner

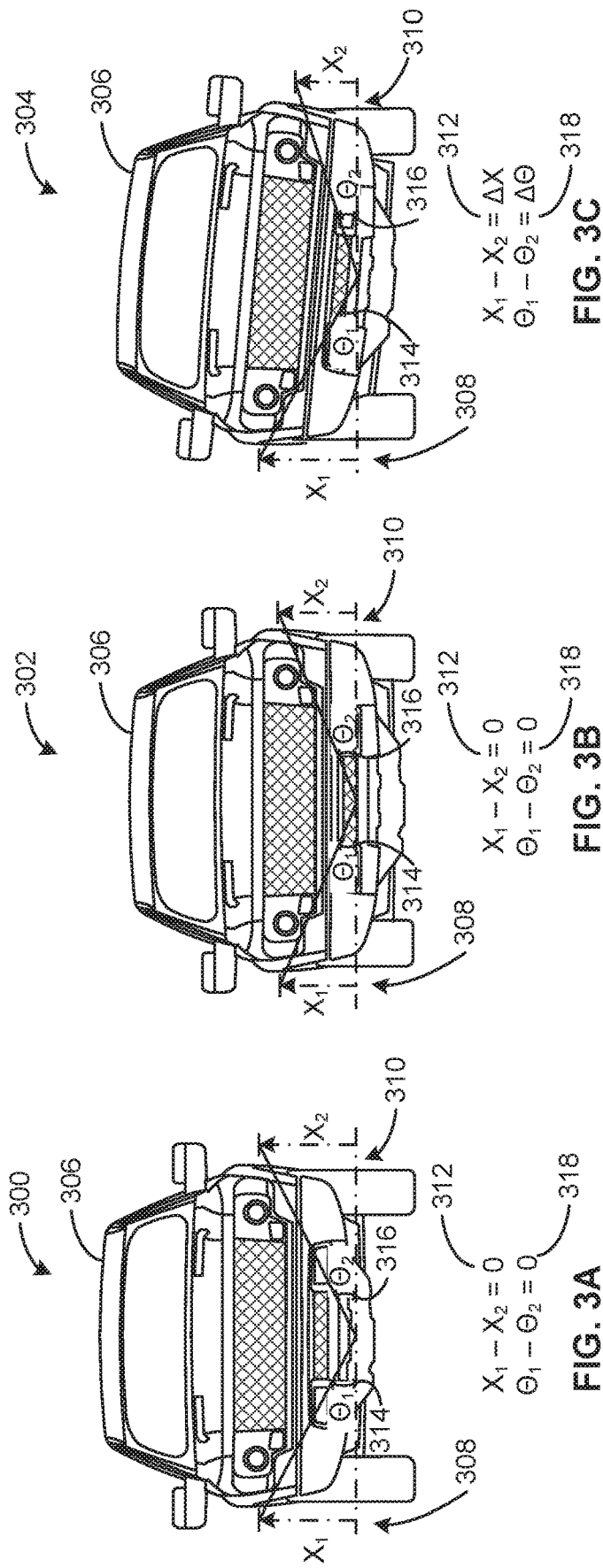

METHODS AND APPARATUS TO COMPENSATE FOR BODY ROLL IN VEHICLE WEIGHT CALCULATIONS

RELATED APPLICATION

U.S. Patent Application Ser. No. 62/665,340 is hereby incorporated herein by reference in its entirety. Priority to U.S. Patent Application Ser. No. 62/665,340 is hereby claimed.

FIELD OF THE DISCLOSURE

This disclosure relates generally to determining the weight of a vehicle and, more particularly, to methods and apparatus to compensate for body roll in vehicle weight calculations.

BACKGROUND

Some vehicle suspension systems include a stay bar (also referred to as an anti-roll bar, a roll bar, an anti-sway bar, a sway bar or a stabilizer bar) to reduce the body roll of a vehicle. Some stay bars are metal rods coupled to the driver side suspension assembly and passenger side suspension assembly along the same axle. Stay bars may be installed on the front axle, rear axle or both axles of a vehicle. Suspension systems with stay bars mechanically transfer some of the vertical load of the more heavily loaded side of the vehicle to the other side of the vehicle via the stay bar. The mechanical transfer of load occurs because stay bars act as torsion springs (e.g., have a stiffness), resist torsion and apply a force to mitigate the asymmetrical loading.

Additionally or alternatively, vehicle suspension systems may also include a solid axle (also referred to a beam axle or rigid axle) linking the driver side suspension assembly and the passenger side suspension assembly. Solid axles force the camber angle of each wheel along the solid axle to be the same. Some multi-axle vehicles may include both solid axles (e.g., the rear axle) and axles fitted with stay bars (e.g., the front axle).

BRIEF DESCRIPTION OF THE DRAWINGS

FIG. 3A is an illustration of an example vehicle in an unloaded position.

FIG. 3B is an illustration of an example vehicle in a symmetrical loaded position.

FIG. 3C is an illustration of an example vehicle in an asymmetrical loaded position.

Figure 1:
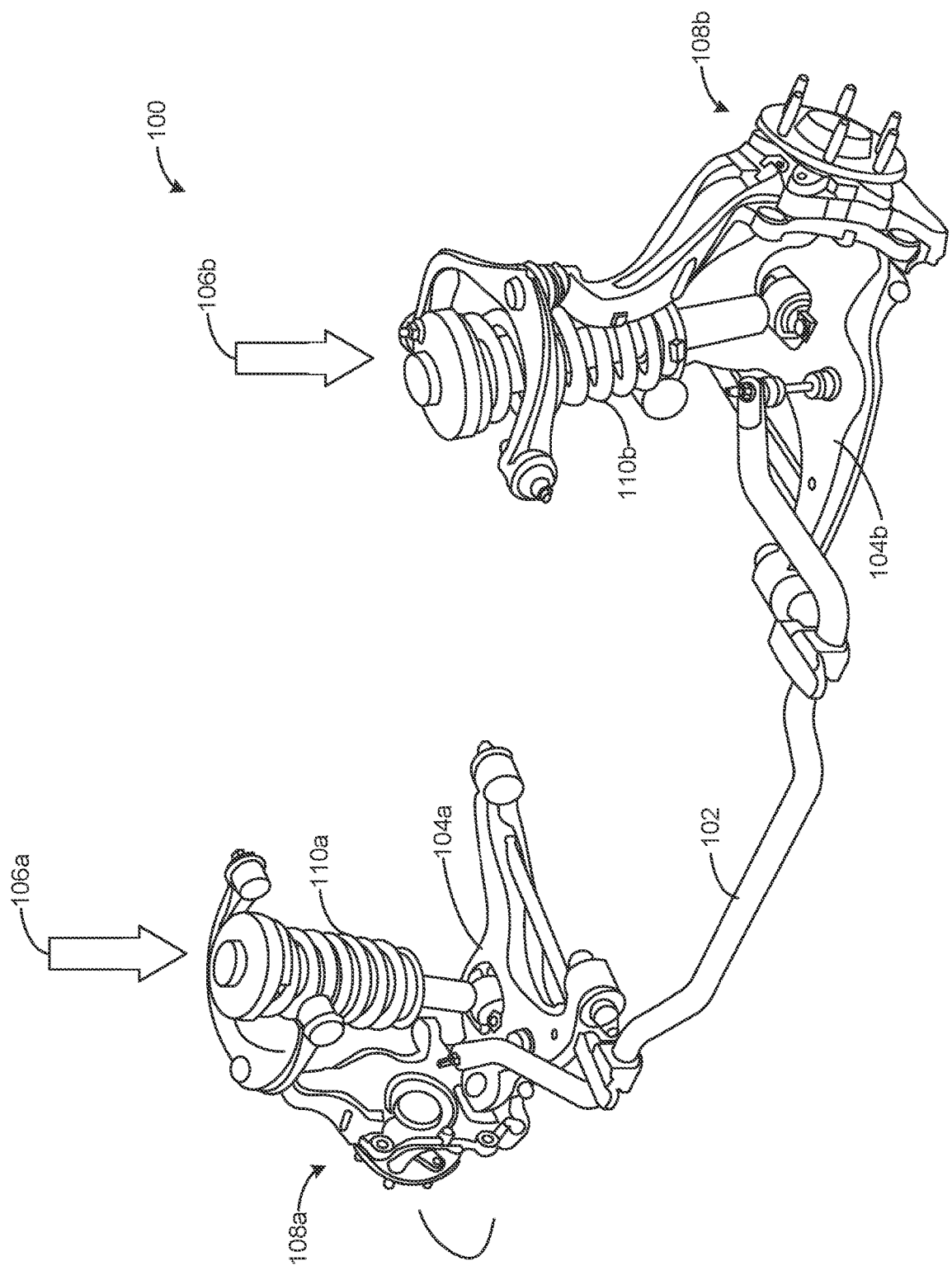
FIG. 1 is an illustration of an example vehicle suspension system on which the teachings of this disclosure may be implemented.

The figures are not to scale. In general, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers). As used herein, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

DETAILED DESCRIPTION

When a vehicle is asymmetrically loaded (e.g., unequal weight on the driver and passenger sides of the vehicle), body roll may occur. As used herein, body roll refers to the rotation of a vehicle body about the center line (longitudinal axis) of the vehicle. As used herein, the angle between the chassis and the ground is referred to as the roll angle. In some examples, body roll causes variations in suspension deflection and/or ride height along each axle. In some examples, the variation in suspension travel and/or ride height may cause the chassis to no longer be parallel to the ground. Vehicle suspension systems that include stay bars compensate for an asymmetrically loaded vehicle and resist body roll.

For vehicle weight calculating systems that use ride height sensors, the effects of a stay bar may, in some examples, result in inaccurate weight measurements due to force being transferred through the stay bar and not the other suspension elements (e.g., the shocks, springs, etc.) of the vehicle suspension. Additionally, for vehicles that include solid axles, force may similarly be transferred through the solid axle, thereby, creating inaccuracy in the weight calculation.

In accordance with the present disclosure, methods and apparatus to compensate for body roll in vehicle weight calculations are disclosed. Examples disclosed herein compensate for the effects of a stay bar by adjusting the weight measurements using the properties of the stay bar and suspension to calculate a roll angle. Examples disclosed herein compensate for the effects of a solid axle by adjusting the weight measurements using the properties of the solid axle and sensor measurements. In some examples disclosed herein, vehicle sensor data is used to calculate the body roll. In some examples disclosed herein, the body roll is compared to a dynamically calculated roll threshold. In some examples disclosed herein, if the body roll exceeds the roll threshold, a weight adjustment is determined.

FIG. 1 is an illustration of an example vehicle suspension system 100 on which the teachings of this disclosure may be implemented. The example suspension system 100 includes an example stay bar 102, an example passenger side suspension assembly 104a, an example driver side suspension assembly 104b, an example passenger side wheel assembly 108a and an example driver side wheel assembly 108b. The example passenger side suspension assembly 104a includes an example first suspension element 110a. The example driver side suspension assembly 104b includes an example second suspension element 110b. The example passenger side suspension assembly 104a is acted upon by a first vertical load 106a and the driver side suspension assembly 104b is acted upon a second vertical load 106b. In the illustrated example, the example stay bar 102 is coupled to the front axle of the vehicle. In other examples, the stay bar 102 may instead be coupled to any suitable axle (e.g., the rear axle). In the illustrated example, the vehicle suspension system 100 is an independent double wishbone coil-over-shock suspension system. In other examples, the vehicle suspension system 100 may be any other suitable type of suspension system (e.g., an air suspension system, a hydraulic suspension system, etc.). In some examples, the vehicle suspension system 100 may be an active suspension system.

The example suspension assemblies 104a, 104b allow the passenger side wheel assembly 108a and the driver side wheel assembly 108b to deflect independently from one another. As used herein, the suspension deflection refers to a length of compression or tension in the suspension elements 110a, 110b of the suspension assembly. In some examples, a change in suspension deflection can be correlated with a change in the ride height of the vehicle (e.g., the road clearance). In some examples, the suspension deflection and/or ride height of the suspension assemblies 104a, 104b may be used to the calculate the overall weight of the vehicle and/or body roll of the vehicle.

The suspension elements 110a,110b are the elements of the suspension system 100 that absorb and/or dampen impacts. For example, the suspension elements 110a, 110b may include springs (or other similar elastic objects) and shocks/dampers. In the illustrated example, the suspension elements 110a, 110b are coil-over-shock suspension devices. In other examples, the suspension elements 110a, 110b may be any other suitable means of absorbing and dampening impacts (e.g., air springs, etc.).

When the first vertical load 106a acts upon the passenger side suspension assembly 104a, the coil spring of passenger side suspension assembly 104a compresses downwards which, allows the passenger wheel assembly 108a to remain in contact with the driving surface. Similarly, in some examples, when the second vertical load 106b acts upon the driver side suspension assembly 104b, the coil spring of the driver side suspension assembly 104b compresses, allowing the wheel assembly 108b to remain in contact with the driving surface. In some examples, the deflections in the coil springs of the suspension assemblies (104a, 104b) may not be equal (e.g., the vertical loads 106a, 106b are not equal, the driving surface is uneven, the vehicle is traversing a corner, etc.). In these examples, the ride heights of the driver and passenger sides of the axle are not equal which, causes the vehicle to have a non-zero body roll.

In the illustrated example of FIG. 1, the stay bar 102 is formed from a cylindrical metal rod and is coupled to the passenger side suspension assembly 104a and the driver side suspension assembly 104b. In some examples, the stay bar 102 acts as a torsion spring with an associated torsional stiffness (k). In some examples, if the example first vertical load 106a exceeds the second vertical load 106b (or, similarly, the second vertical load 106b exceeds the first vertical load 106a), the resulting force applied to the passenger side suspension assembly 104a and driver side suspension assembly 104b causes a torsion to be exerted on the stay bar 102. In this example, the stay bar 102 resists the torsion and transfers the load from the more heavily loaded passenger side assembly suspension 104a to the more lightly loaded driver side suspension assembly 104b. In some examples, the transfer of load via the stay bar 102 reduces the difference in suspension deflection between the driver side and passenger side of the axle of the suspension system 100, and thus the difference in ride height and overall body roll of the vehicle. In some examples, the torsion in the stay bar 102 reduces the total deflection of the suspension assemblies 104a, 104b (e.g., the sum of the deflections) when compared to an axle without the stay bar 102 under the same loading conditions (e.g., the vertical loads 106a, 106b).

Figure 2A:
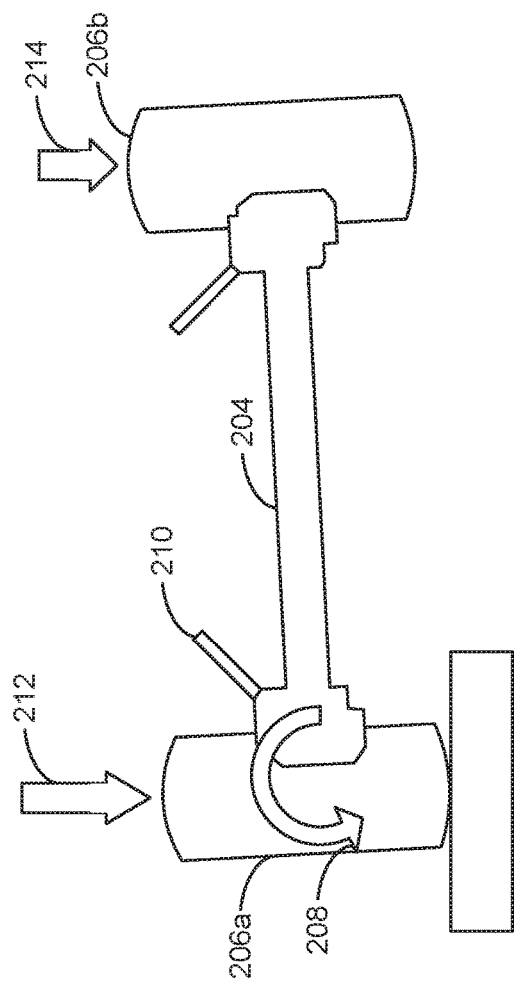
FIG. 2A is an illustration of an example vehicle suspension system including a solid axle and a wheel exhibiting positive camber.

FIG. 2A is an illustration of an example vehicle suspension system 200 including an example solid axle 204 and an example wheel assembly 206a exhibiting positive camber. The example vehicle suspension system 200 also includes an example right wheel assembly 206b and an example suspension assembly 210. In the illustrated example of FIG. 2A, the left and right sides of the example solid axle 204 are acted upon by a first vertical load 212 and a second vertical load 214. In the illustrated example, the wheel assembly 206 is exhibiting a positive camber 208.

In illustrated example, the example wheel assemblies 206a, 206b are exhibiting positive camber 208 because the first vertical load 212 is greater than the second vertical load 214. In some examples, the solid axle 204 does not allow the wheel assembly 206a, 206b to have different cambers. In some examples, the resulting camber in the wheel assemblies 206a, 206b causes a portion of the first vertical load 212 to be transferred through the solid axle 204 from the left wheel assembly 206a to right left wheel assembly 206b. In this example, the portion of the load transferred through the solid axle 204 does not result in deflection in the suspension assembly 210.

Figure 2B:
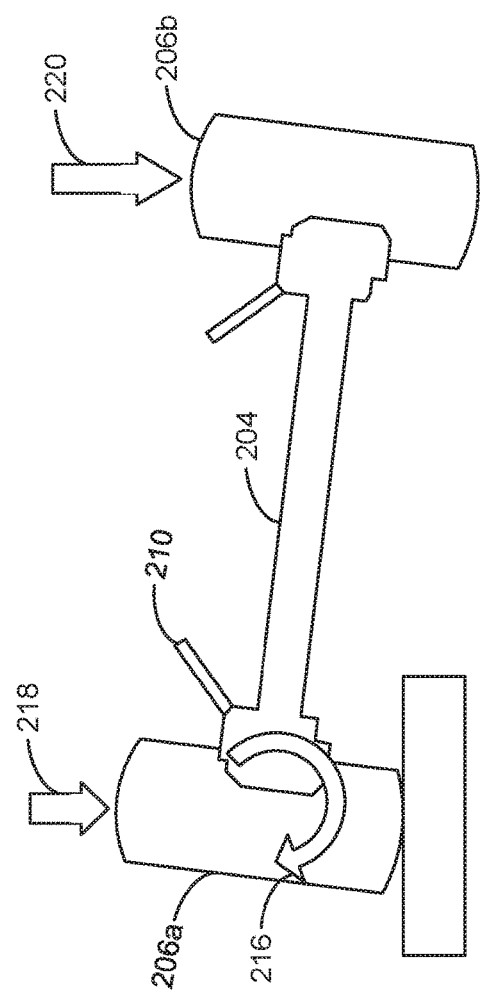
FIG. 2B is an illustration of an example vehicle suspension system including a solid axle and a wheel exhibiting negative camber.

FIG. 2B is an illustration of the example vehicle suspension system 200 including the example solid axle 204 and the example wheel assembly 206a exhibiting a negative camber. The example vehicle suspension system 200 also includes the example right wheel assembly 206b and the example suspension assembly 210. In the illustrated example of FIG. 2A, the left and right sides of the example solid axle 204 are acted upon by a third vertical load 218 and a fourth vertical load 220, respectively. In the illustrated example, the wheel assembly 206 is exhibiting a positive camber 216.

In illustrated example, the example wheel assemblies 206a, 206b are undergoing positive camber 216 that is caused because the fourth vertical load 220 is greater than the third vertical load 218. In some examples, the solid axle 204 does not allow the wheel assembly 206a, 206b to have different cambers. In some examples, the resulting camber in the wheel assemblies 206a, 206b cause portions of the fourth vertical load 220 to be transferred through the solid axle 204 from the right wheel assembly 206a to left wheel assembly 206b. In this example, the load transferred through the solid axle 204 does not result in deflection in the suspension assembly 210.

FIGS. 3A-3C illustrate an example vehicle 306 in various loading conditions. FIG. 3A illustrates the vehicle 306 in an unloaded condition 300. FIG. 3B illustrates the example vehicle 306 in a symmetrical loading condition 302. FIG. 3C illustrates the example vehicle 306 in an asymmetrical loading condition 304. In the illustrated example, the vehicle 306 is a two-axle vehicle. In other examples, the vehicle 306 may have more than two axles. In the illustrated example, the front axle of the example vehicle 306 includes a stay bar and the rear axle includes a solid axle suspension system. In other examples, the front and rear axles may include any suitable suspension systems. The example vehicle 306 includes an example passenger side front axle ride height sensor 308 and an example driver front axle ride height sensor 310. In some examples, the ride height sensors 308, 310 measure the deflection in the suspension elements (e.g., the suspension elements 110a, 110b of FIG. 1) in the vehicle suspension. In other examples, the ride height sensors 308, 310 may instead measure any other suitable quantity (e.g., a distance sensor directly measuring the clearance, etc.). An example ride height differential 312 is the difference between the ride heights as measured by the ride height sensors 308, 310.

In the illustrated example of FIG. 3A, the vehicle 306 is in an unloaded condition 300. The unloaded condition 300 does not include any objects in the vehicle 306 that would cause the suspension of the vehicle 306 to deflect beyond its resting position (e.g., position of suspension under only the weight of the vehicle 306). In the illustrated example, the ride height differential 312, as calculated from the ride height sensors 308, 310, is zero.

In the illustrated example of FIG. 3B, the vehicle 306 is in the symmetrically loaded condition 302. In the symmetrically loaded condition 300, the driver and passenger sides of the vehicle are equally loaded (e.g., have passengers of approximately equal weight, etc.) which, causes both sides of the suspension of the vehicle 306 to be equally deflected. In the illustrated example, the ride height differential 312, as calculated from the ride height sensors 308, 310, is zero.

In the illustrated example of FIG. 3C, the vehicle 306 is in an asymmetrically loaded condition 304. In the asymmetrically loaded condition 304, the driver side of vehicle 306 is loaded more heavily than the passenger side of the vehicle 306 (e.g., only the driver is riding the vehicle) which, causes the suspension element of driver side suspension assembly to have a greater deflection than the suspension element of passenger side suspension assembly. In the illustrated example, the ride height differential 312, as calculated from the ride height sensors 308, 310, is the difference measured between the ride passenger front axle ride height sensor 308 and an example driver front axle ride height sensor 310.

In the illustrated example load conditions 300, 302, 304, an example roll angle 318 may be calculated from the ride height differential 312. For example, using trigonometric properties, an example passenger side suspension angle 314 and an example driver side suspension angle 316 may be calculated from the measured ride heights. In the illustrated example, the roll angle 318 is the difference between the angles 314, 316. Additionally or alternatively, the roll angle 318 may be calculated/measured by any other suitable means (e.g., a strain gauge on the stay bar 102, a strain gauge on the solid axle 204, a tilt sensor, a camera, etc.).

Figure 4:
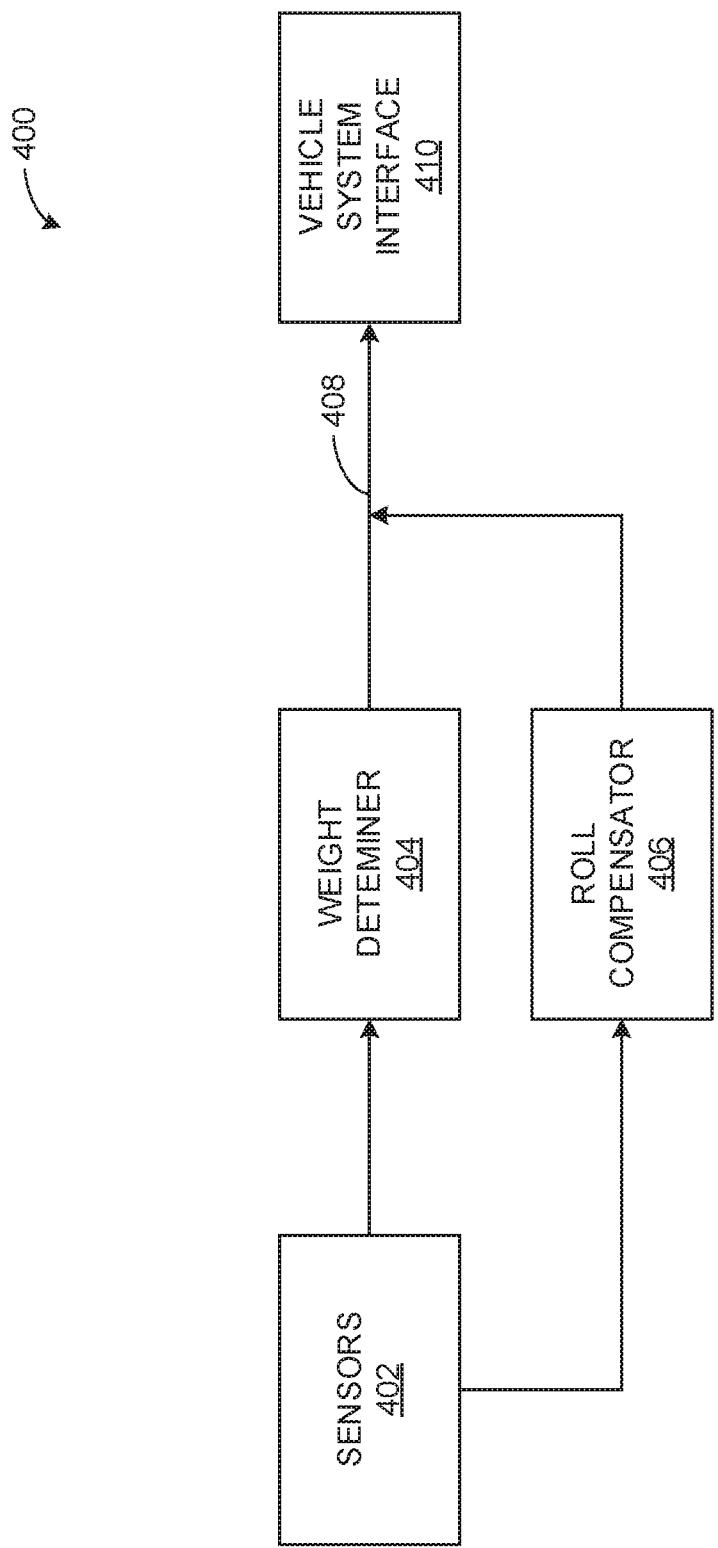
FIG. 4 is a vehicle weight calculation system in which the teachings of this disclosure may be implemented.

FIG. 4 is an illustration of an example weight calculation system 400 in which the teachings of this disclosure may be implemented. The example weight calculation system 400 includes example sensors 402, an example weight determiner 404, an example roll compensator 406 and an example vehicle system interface 410. The example weight calculation system 400 outputs an example corrected vehicle weight 408. In some examples, the example weight calculation system 400 may be implemented in the powertrain control unit (PCU) of a vehicle.

In the illustrated example, the sensors 402 (e.g., the sensors 502-510 of FIG. 5) output sensor data to the weight determiner 404 and the roll compensator 406. In some examples, the weight calculation system 400 (e.g., the roll compensator 406 and the weight determiner 404) communicate with the sensors 402 via the vehicle's Controller Area Network (CAN) system. In some examples, the vehicle CAN system allows the weight calculation system 400 to communicate with the sensors with a host computer. In other examples, the weight calculator system 400 communicates with the sensors 402. Alternatively, the sensors 402 may communicate with the weight calculation system 400 by any suitable means.

In some examples, the weight determiner 404 calculates the vehicle weight using data received from the sensors 402. For example, the weight determiner 404 may use suspension deflection/ride height sensor data to determine the load of each wheel of the vehicle. In this example, the weight determiner 404 uses the properties of the suspension (e.g., the spring stiffness) to calculate the load on each wheel of the vehicle and sums each of the determined loads to determine the overall load. Alternatively, the weight determiner 404 may calculate the total weight of the vehicle by any suitable means. In some examples, the weight determiner 404 only functions correctly when the vehicle is on level ground. In some examples, the weight determiner 404 incorrectly determines the weight of the vehicle due the presence of a stay bar, solid axle or any other similar suspension system.

The roll compensator 406 compensates for the body roll of the vehicle when calculating the total of weight of the vehicle. For example, the roll compensator 406 may calculate a correction factor to adjust the weight determiner 404. In some examples, the correction factor may be used to adjust the weight calculated by the weight determiner 404 into the corrected vehicle weight 408. In some examples, the roll compensator 406 may be a component of the weight determiner 404.

The example vehicle system interface 410 allows the weight determiner 404 and roll compensator 406 to interface with other systems of the vehicle (e.g., the vehicle 306 of FIG. 3). For example, the vehicle system interface 410 can use the corrected vehicle weight 408 to modify a system of the vehicle to account for the weight of the vehicle 306. In some examples, the vehicle system interface 410 may modify a power steering system of the vehicle. In other examples, any appropriate system may be modified by the vehicle system interface 410 (e.g., a braking system, a fuel supply system, etc.). In other examples, the vehicle system interface 410 may interface with a output device (e.g., the output device 724 of FIG. 7) to alert a user of the corrected weight 408.

Figure 5:
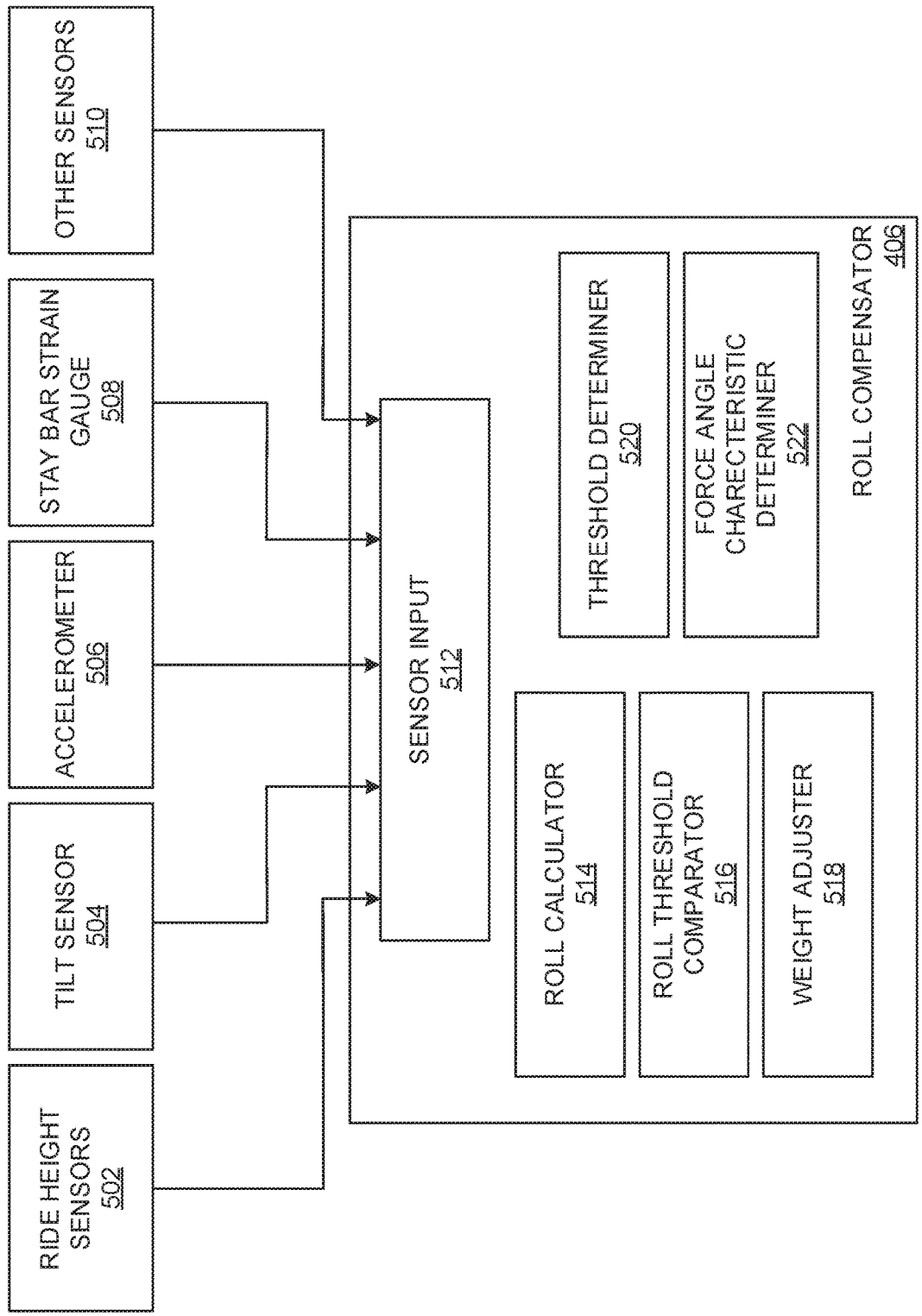
FIG. 5 is a block diagram of the example roll compensator of FIG. 4 on which the teachings of this disclosure may be implemented.

FIG. 5 is a block diagram of the example roll compensator 406 of FIG. 4 on which the teachings of this disclosure may be implemented. The example roll compensator 406 of FIG. 4 includes an example sensor input 512, an example roll calculator 514, an example roll threshold comparator 516, an example weight adjuster 518, an example threshold determiner 520, and an example force angle characteristic determiner 522. The example sensor input 512 receives inputs from example ride height sensors 502, an example tilt sensor 504, an example accelerometer 506, an example stay bar strain gauge 508 and other sensors 510.

The example ride height sensors 502 measure the ride height associated with each wheel of the vehicle. In some examples, the ride height sensors 502 measure the deflection of each suspension element of the suspension system of the vehicle (e.g., using a force gauge, any suitable measuring a spring's deflection). In other examples, the ride height sensors may determine the ride height by any other suitable means (e.g., distance sensor, etc.).

The example tilt sensor 504 measures the tilt of the vehicle. The example accelerometer 506 measures vehicle tilt relative to the Earth's gravity vector. In some examples, the accelerometer 506 may be an analog low-gravity 3-axis accelerometer. In other examples, the accelerometer 506 may any suitable type of accelerometer (e.g., a digital 3-axis accelerometer, etc.) In some examples, the magnitude of the output of the accelerometer 506 is proportional to the sine of the body roll of the vehicle.

The example stay bar strain gauge 508 measures the strain in the stay bar (e.g., the stay bar 102 of FIG. 1). The other sensors 510 include any other suitable sensors having outputs that may be used to calculate the roll angle of the vehicle.

The sensor input 512 directs the relevant sensor values (e.g., the outputs of the sensors 502-510) into the example roll calculator 514, the example roll threshold comparator 516, the example weight adjuster 518, the example threshold determiner 520 and the example force angle characteristic determiner 522 as required.

The roll calculator 514 calculates the roll angle/body roll of the vehicle using the sensor data provided by the example sensors input 512. For example, the roll calculator 514 may calculate the roll angle by determining the ride height differential (e.g., using trigonometry, see FIG. 3C). In other examples, the roll calculator 514 may use any suitable method to calculate the roll angle of the vehicle (e.g., the vehicle 306).

The roll threshold comparator 516 compares the calculated roll to a roll threshold. For example, the roll threshold comparator 516 may compare the roll angle calculator by the roll calculator to the threshold determined by threshold determiner 520 to determine if the roll angle satisfies the threshold.

The weight adjuster 518 calculates the weight adjustment factor to be applied to the normal determined weight (e.g., as determined weight determiner 404 of FIG. 4). For example, the weight adjuster 518 may use the force-angle characteristics as determined by the force angle characteristics determiner 522. For example, the weight adjuster 518 may use Equation (1) below to determine the adjustment:

$$A = \Delta\theta\left(\frac{F}{\delta}\right)$$ Equation 1 where A is the weight adjustment, $\Delta\theta$ is the determined body roll of the vehicle and $$\left(\frac{F}{\delta}\right)$$

is the suspension force angle characteristic. In some examples, the suspension force angle characteristic is determined by the force angle characteristic determiner 522. In other examples, the weight adjuster 518 may use any other suitable equation or method to determine the weight adjustment.

The threshold determiner 520 determines a suitable threshold to be used by the roll threshold comparator 516. For example, the threshold determiner 520 may determine an appropriate roll threshold as the angle at which the roll angle (e.g., the roll angle 318 of FIG. 3) and/or ride height different (e.g., the ride height differential 312 of FIG. 3) causes the engagement of a roll reduction mechanism of the vehicle (e.g., a stay bar or a solid axle.) In some examples, the threshold determiner 520 may determine the roll threshold based on a critical camber (e.g., the cambers 208, 216 of FIG. 2). In some examples, the roll threshold may be a static value associated with the make, model and/or suspension system of the vehicle. In this example, the roll threshold may be determined experimentally. In other examples, the threshold determiner 520 may determine a dynamic roll threshold based on the empirically determined properties of the vehicle suspension system. In some examples, as the suspension system of the vehicle wears with age (e.g., the stiffness of the suspension and/or stay bar decreases from wear), the threshold determiner 520 may modify the roll threshold as appropriate. In some examples, the threshold determiner 520 may use any other suitable method to determine the roll threshold.

The force angle characteristic determiner 522 determines the suspension force angle characteristic for use by the weight adjuster 518. For example, the force angle characteristic determiner 522 may determine the $$\left(\frac{F}{\delta}\right)$$

of Equation 1. In some examples, the force angle characteristic determiner 522 may determine the force angle characteristic based on the make, model and/or suspension system of the vehicle. In some examples, the force angle characteristic determiner 522 may determine the force/angle characteristic based on experimental data. In this example, as the suspension system of the vehicle wears with age (e.g., the stiffness of the suspension and/or stay bar decreases from wear), the force angle characteristic determiner 522 may modify the force angle characteristic as appropriate.

While an example manner of implementing the roll compensator 406 of FIG. 4 is illustrated in FIG. 5, one or more of the elements, processes and/or devices illustrated in FIG. 5 may be combined, divided, re-arranged, omitted, eliminated and/or implemented in any other way. Further, the example ride height sensors 502, the example tilt sensor 504, the example accelerometer 506, the example stay bar strain gauge 508, the other sensors 510, the example sensor input 512, the example roll calculator 514, the example roll threshold comparator 516, the weight adjuster 518, the example threshold determiner 520, the example force angle characteristic determiner 522 and/or, more generally, the example roll compensator 406 may be implemented by hardware, software, firmware and/or any combination of hardware, software and/or firmware. Thus, for example, any of the example ride height sensors 502, the example tilt sensor 504, the example accelerometer 506, the example stay bar strain gauge 508, the other sensors 510, the example sensor input 512, the example roll calculator 514, the example roll threshold comparator 516, the weight adjuster 518, the example threshold determiner 520, the example force angle characteristic determiner 522 and/or, more generally, the example roll compensator 406 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, ride height sensors 502, the example tilt sensor 504, the example accelerometer 506, the example stay bar strain gauge 508, the other sensors 510, the example sensor input 512, the example roll calculator 514, the example roll threshold comparator 516, the weight adjuster 518, the example threshold determiner 520, the example force angle characteristic determiner 522 is/are hereby expressly defined to include a non-transitory computer readable storage device or storage disk such as a memory, a digital versatile disk (DVD), a compact disk (CD), a Blu-ray disk, etc. including the software and/or firmware. Further still, the example roll compensator of FIG. 4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
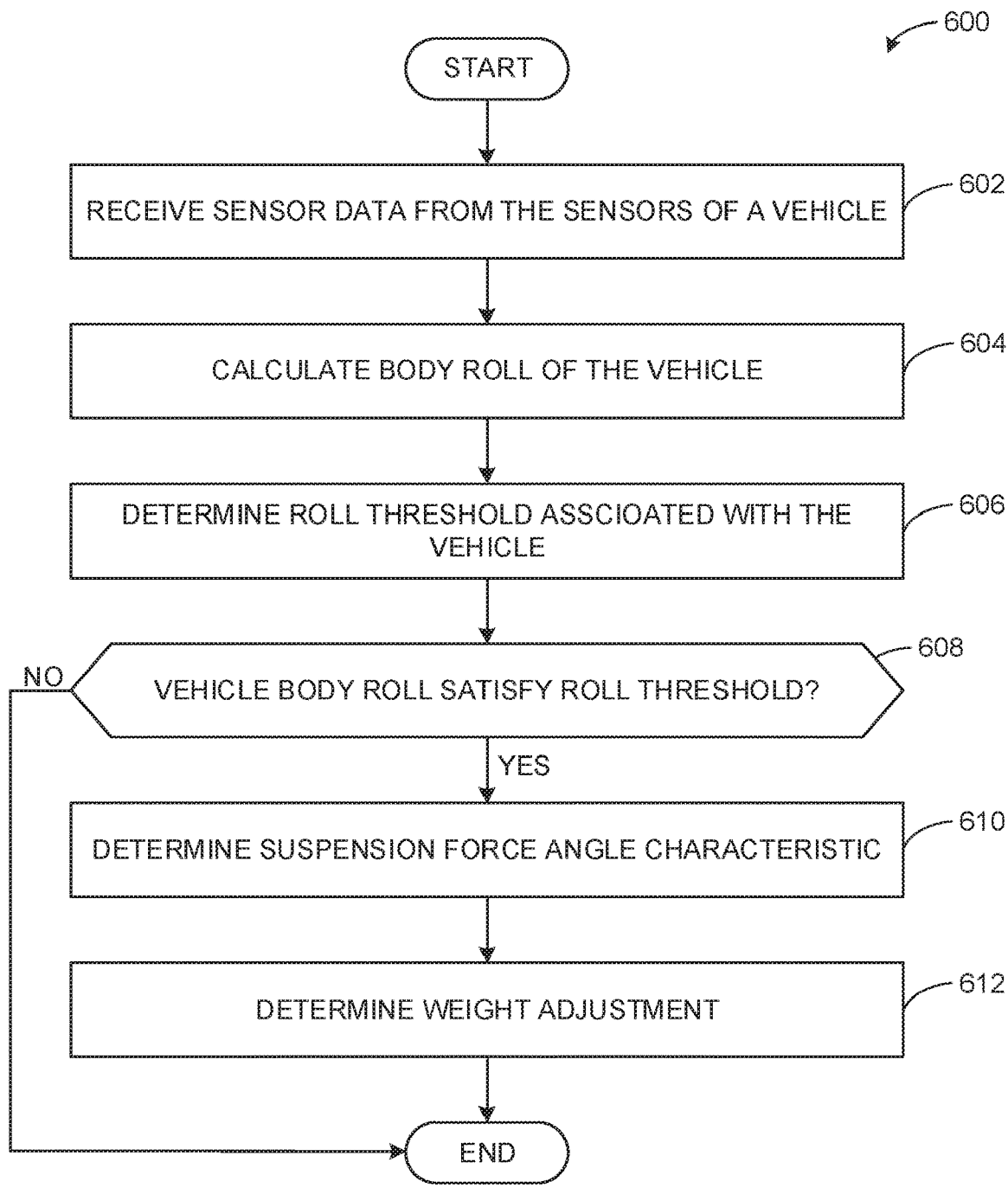
FIG. 6 is a flow diagram of an example method to compensate for asymmetrical loading in vehicle weight determination.

A flowchart representative of an example method for implementing the roll compensator 406 of FIG. 4 is shown in FIG. 6. The methods may be implemented using machine readable instructions. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example roll compensator 406 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example methods of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The method 600 of FIG. 6 begins at block 602. At block 602, the sensor input 512 receives sensor data from the sensors of a vehicle. For example, the example sensor input 512 may receive sensor data from any combination of the example sensors 502-510 of FIG. 5. Additionally or alternatively, the sensor input 512 may calculate any required sensor data value(s) from other sensor data collected for any combination of the example sensors 502-510 and/or known properties of the vehicle. After all sensor data has been received and/or calculated, the method 600 advances to block 604.

At block 604, the roll calculator 514 calculates the body roll of the vehicle. For example, the roll calculator may use the ride height sensor data (as collected by the ride height sensors 502 of FIG. 5) to determine the ride height differential (e.g., the ride height differential 312 of FIG. 3). In this example, the roll calculator 514 may then use trigonometric relationships to determine the body roll of the vehicle (e.g., the roll angle 318 of FIG. 3). In other examples, the roll calculator 514 may use any sensor data to calculate the body roll of the vehicle. Once the body roll has been calculated, the method 600 advance to block 606.

At block 606, the threshold determiner 520 determines the roll threshold associated with the vehicle. For example, the threshold determiner 520 may determine the roll threshold based on the make, model and/or suspension system of the vehicle. In some examples, the threshold determiner 520 may determine the roll threshold such that the roll threshold corresponds to the engagement of an anti-roll mechanism of the vehicle (e.g., a stay bar). In some examples, the roll threshold determiner 520 may determine the roll threshold such that the roll threshold corresponds to a critical camber of the wheels of the vehicle. In some examples, the roll threshold may be determined experimentally. In some examples, the roll threshold may vary dynamically based on the age of the suspension system, ambient conditions and/or any other suitable determinates. In some examples, the roll threshold corresponds to the minimum roll angle for which the calculated vehicle weight must be accounted. In some examples, the threshold corresponds to a critical camber of a wheel of the vehicle. Once the roll threshold has been determined, the method 600 advances to block 608.

At block 608, the roll threshold comparator 516 determines if the vehicle threshold satisfies the roll threshold. For example, the roll threshold comparator 516 may compare the body roll, as calculated in block 604, to the roll threshold, as determined at block 606. If the roll threshold is satisfied, a weight adjustment is required and the method 600 advances to block 610. If the roll threshold is not satisfied, a weight adjustment is not required, and the method 600 ends.

At block 610, the force angle characteristic determiner 522 determines the suspension force angle characteristic. For example, the force angle characteristic determiner 522 may determine the suspension force angle characteristic based on the make, model and/or suspension system of the vehicle. In some examples, the force angle characteristic may be determined experimentally. In some examples, the force angle characteristic may vary dynamically based on the age of the suspension system, ambient conditions and/or any other suitable determinates. Once the roll threshold has been determined, the method 600 advances to block 612.

At block 612, the weight adjuster determines the weight adjustment. For example, the weight adjuster may determine the weight adjust using equation (1), the determined suspension force angle characteristic and the body roll. In other examples, the weight adjuster may use any suitable method, vehicle properties and/or sensor data to determine the weight adjustment. Once the weight adjustment has been calculated, the method 600 ends.

Figure 7:
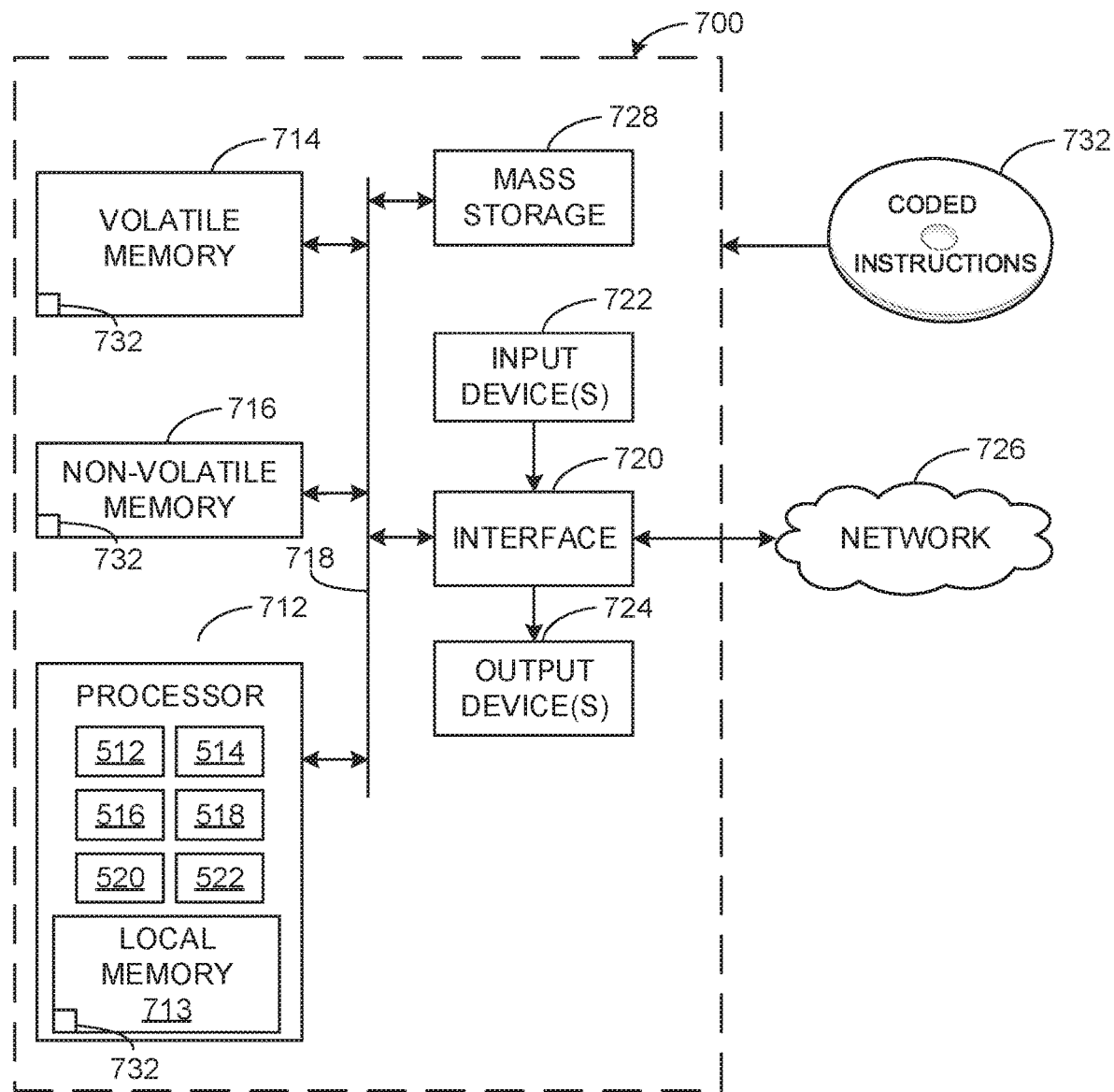
FIG. 7 is a block diagram of an example processor platform structured to execute instructions to implement the roll compensator of FIG. 4.

FIG. 7 is a block diagram of an example processor platform 700 capable of executing instructions to implement the method 600 of FIG. 6 to implement the roll compensator 406 of FIG. 4. The processor platform 700 can be, for example, a server, a personal computer, a workstation, a self-learning machine (e.g., a neural network), a mobile device (e.g., a cell phone, a smart phone, a tablet such as an iPad™) or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example sensor input 512, the example roll calculator 514, the example roll threshold comparator 516, the weight adjuster 518, the example threshold determiner 520 and the example force angle characteristic determiner 522.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 128 include floppy disk drives, hard drive disks, compact disk drives, Blu-ray disk drives, redundant array of independent disks (RAID) systems, and digital versatile disk (DVD) drives.

The machine executable instructions 732 to implement the method 600 FIG. 6 may be stored in the mass storage device 728, in the volatile memory 714, in the non-volatile memory 716, and/or on a removable non-transitory computer readable storage medium such as a CD or DVD.

From the foregoing, it will be appreciated that example methods and apparatus have been disclosed to compensate for body roll when calculating the weight of a vehicle. The disclosed methods and apparatus account for body roll in weight calculations using existing sensors. Correctly compensating for body roll allows for the weight of vehicle to be more accurately determined and, thus, allow part life to be more accurately determined. Additionally, vehicle systems that rely on accurately calculated vehicle weights function better due to the more accurate weight determination.

Example 1 includes an apparatus, comprising a sensor input to receive sensor data from sensors of a vehicle, a weight determiner to determine a weight of the vehicle based on the sensor data, a roll calculator to determine a body roll of the vehicle based on the sensor data, a roll threshold comparator to compare the body roll to a threshold, and a weight adjuster to, if the body roll satisfies the threshold, adjust the determined weight of the vehicle based on the determined body roll and properties of a suspension system of the vehicle.

Example 2 includes the apparatus of example 1, wherein the threshold corresponds to an engagement of an anti-roll mechanism of the vehicle.

Example 3 includes the apparatus of example 2, wherein the anti-roll mechanism is a stay bar.

Example 4 includes the apparatus of example 1, wherein the threshold corresponds to a critical camber of a wheel of the vehicle.

Example 5 includes the apparatus of example 1, wherein the sensors of the vehicle include at least one of a ride height sensor, a tilt sensor, an accelerometer or a stay bar strain gauge.

Example 6 includes the apparatus of example 1, further including a threshold determiner to determine the threshold of the vehicle based on the sensor data, and a force angle characteristic determiner to determine the properties of the suspension system.

Example 7 includes the apparatus of example 1, a vehicle system interface to adjust a driving characteristic based on the adjusted weight.

Example 8 includes a method comprising receiving sensor data from sensors of a vehicle, determining a weight of the vehicle based on the sensor data, determining a body roll of the vehicle based on the sensor data, comparing the body roll to a threshold, and if the body roll satisfies the threshold, adjusting the determined weight of the vehicle based on the determined body roll and properties of a suspension system of the vehicle.

Example 9 includes the method of example 8, wherein the threshold corresponds to an engagement of an anti-roll mechanism of the vehicle.

Example 10 includes the method of example 9, wherein the anti-roll mechanism is a stay bar.

Example 11 includes the method of example 8, wherein the threshold corresponds to a critical camber of a wheel of the vehicle.

Example 12 includes the method of example 8, wherein the sensors of the vehicle include at least one of a ride height sensor, a tilt sensor, an accelerometer or a stay bar strain gauge.

Example 13 includes the method of example 8, further including determining the threshold of the vehicle based on the sensor data, and determining the properties of the suspension system.

Example 14 includes the method of example 8, further including adjusting a driving characteristic based on the adjusted weight.

Example 15 includes a tangible machine-readable storage medium including instructions which, when executed, cause a processor to at least receive sensor data from sensors of a vehicle, determine a weight of the vehicle based on the sensor data, determine a body roll of the vehicle based on the sensor data, compare the body roll to a threshold, and if the body roll satisfies the threshold, adjust the determined weight of the vehicle based on the determined body roll and properties of a suspension system of the vehicle.

Example 16 includes the tangible machine-readable storage medium of example 15, wherein the threshold corresponds to an engagement of an anti-roll mechanism of the vehicle.

Example 17 includes the tangible machine-readable storage medium of example 15, wherein the threshold corresponds to a critical camber of a wheel of the vehicle.

Example 18 includes the tangible machine-readable storage medium of example 15, wherein the sensors of the vehicle include at least one of a ride height sensor, a tilt sensor, an accelerometer or a stay bar strain gauge.

Example 19 includes the tangible machine-readable storage medium of example 15, further including determining the threshold of the vehicle based on the sensor data and determining the properties of the suspension system.

Example 20 includes the tangible machine-readable storage medium of example 15, further including adjusting a driving characteristic based on the adjusted weight.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. An apparatus, comprising:
   a sensor input to receive sensor data from sensors of a vehicle;
   a weight determiner to determine a weight of the vehicle based on the sensor data;
   a roll calculator to determine a body roll of the vehicle based on the sensor data;
   a threshold determiner to determine a roll threshold based on at least one of a make of the vehicle, a model of the vehicle, or a suspension system of the vehicle;
   a roll threshold comparator to compare the body roll to the roll threshold;
   a force angle characteristic determiner to determine a suspension force angle characteristic;
   a weight adjuster to, when the body roll satisfies the roll threshold, adjust the determined weight of the vehicle based on the determined body roll and the suspension force angle characteristic; and
   a vehicle system interface to adjust a driving characteristic of the vehicle based on the adjusted weight.

2. The apparatus of claim 1, wherein the roll threshold corresponds to an engagement of an anti-roll mechanism of the vehicle.

3. The apparatus of claim 2, wherein the anti-roll mechanism is a stay bar.

4. The apparatus of claim 1, wherein the roll threshold corresponds to a critical camber of a wheel of the vehicle.

5. The apparatus of claim 1, wherein the sensors of the vehicle include at least one of a ride height sensor, a tilt sensor, an accelerometer or a stay bar strain gauge.

6. A method comprising:
   receiving sensor data from sensors of a vehicle;
   determining a weight of the vehicle based on the sensor data;
   determining a body roll of the vehicle based on the sensor data;
   determining a roll threshold based on at least one of a make of the vehicle, a model of the vehicle, or a suspension system of the vehicle;
   comparing the body roll to the roll threshold;
   determining a suspension force angle characteristic;
   when the body roll satisfies the roll threshold, adjusting the determined weight of the vehicle based on the determined body roll and the suspension force angle characteristic; and
   adjusting a driving characteristic of the vehicle based on the adjusted weight.

7. The method of claim 6, wherein the roll threshold corresponds to an engagement of an anti-roll mechanism of the vehicle.

8. The method of claim 7, wherein the anti-roll mechanism is a stay bar.

9. The method of claim 6, wherein the roll threshold corresponds to a critical camber of a wheel of the vehicle.

10. The method of claim 6, wherein the sensors of the vehicle include at least one of a ride height sensor, a tilt sensor, an accelerometer or a stay bar strain gauge.

11. A non-transitory machine-readable storage medium including instructions which, when executed, cause a processor to at least:
    receive sensor data from sensors of a vehicle;
    determine a weight of the vehicle based on the sensor data;
    determine a body roll of the vehicle based on the sensor data;
    determine a roll threshold based on at least one of a make, a model, or a suspension system of the vehicle; and
    compare the body roll to the roll threshold;
    determine a suspension force angle characteristic;
    when the body roll satisfies the roll threshold, adjust the determined weight of the vehicle based on the determined body roll and the suspension force angle characteristic; and adjust a driving characteristic of the vehicle based on the adjusted weight.

12. The non-transitory machine-readable storage medium of claim 11, wherein the roll threshold corresponds to an engagement of an anti-roll mechanism of the vehicle.

13. The non-transitory machine-readable storage medium of claim 11, wherein the roll threshold corresponds to a critical camber of a wheel of the vehicle.

14. The non-transitory machine-readable storage medium of claim 11, wherein the sensors of the vehicle include at least one of a ride height sensor, a tilt sensor, an accelerometer or a stay bar strain gauge.

\* \* \* \* \*